United States Patent
Charlier De Chily et al.

(10) Patent No.: US 8,328,997 B2
(45) Date of Patent: Dec. 11, 2012

(54) CHEMICAL SYNTHESIS COMPRISING HEAT TREATMENT BY INTERMITTENT DIELECTRIC HEATING COMBINED WITH A RECYCLING SYSTEM

(75) Inventors: Pierre Charlier De Chily, St Brevin les Pins (FR); Mikaële Raynard, St Brevin les Pins (FR)

(73) Assignee: Aldivia SA, Saint-Genis-Laval (FR)

( * ) Notice: Subject to any disclaimer, the term of this patent is extended or adjusted under 35 U.S.C. 154(b) by 128 days.

(21) Appl. No.: 12/493,715

(22) Filed: Jun. 29, 2009

(65) Prior Publication Data

US 2010/0025227 A1 Feb. 4, 2010

Related U.S. Application Data

(63) Continuation of application No. 10/540,518, filed as application No. PCT/FR03/03752 on Dec. 17, 2003, now abandoned.

(30) Foreign Application Priority Data

Dec. 23, 2002 (FR) ..................... 02 16743

(51) Int. Cl.
*C07C 4/00* (2006.01)
*C07C 6/00* (2006.01)

(52) U.S. Cl. ............. 204/157.15; 204/157.9; 204/157.6; 204/157.3; 204/157.8; 204/157.87; 204/157.21; 204/157.73; 204/157.76; 554/124; 554/129; 554/167; 554/168; 554/169; 554/175

(58) Field of Classification Search .................... None
See application file for complete search history.

(56) References Cited

U.S. PATENT DOCUMENTS

| 3,432,413 A | 3/1969 | Vanderhoff |
| 5,239,017 A | 8/1993 | Pelesko et al. |
| 5,350,686 A | 9/1994 | Jhingan |
| 6,656,980 B1 | 12/2003 | Charlier De Chily |

FOREIGN PATENT DOCUMENTS

| DE | 10035949 A1 | 2/2002 |
| EP | 0134622 A2 | 3/1985 |
| EP | 0281041 A1 | 9/1988 |
| EP | 0992480 A1 | 4/2000 |
| GB | 677688 A | 8/1952 |
| WO | 0026265 A1 | 5/2000 |

OTHER PUBLICATIONS

Zhang X. et al., Effects fo microwave dielectric heating on heterogeneous catalysis, 2003, Catalysis Letters, vol. 88, No. 1-2, pp. 3338.*

* cited by examiner

*Primary Examiner* — Yate K Cutliff
(74) *Attorney, Agent, or Firm* — Rothwell, Figg, Ernst & Manbeck, P.C.

(57) ABSTRACT

This invention relates to the design of a process by intermittent dielectric heating combined with a recycling system.

This process consists in subjecting reagents to electromagnetic waves selected in the frequencies ranging between 300 GHz and 3 MHz intermittently using a recycling system.

This process enables the treatment of oils that are hardly absorbent as well as great investment savings.

This process enables operation on different scales, whether in laboratories, on a semi-industrial or industrial scale, without forfeiting the advantages of continuous dielectric heating.

24 Claims, 4 Drawing Sheets

CHEMICAL SYNTHESIS COMPRISING HEAT TREATMENT BY INTERMITTENT DIELECTRIC HEATING COMBINED WITH A RECYCLING SYSTEM

CROSS REFERENCE TO RELATED APPLICATION

This application is a continuation of U.S. patent application Ser. No. 10/540,518, filed Apr. 13, 2006 now abandoned, which is a USC §371 National Phase Entry Application, designating the United States, of PCT/FR03/03752, filed Dec. 17, 2003, to which priority is claimed.

BACKGROUND OF THE INVENTION

Regardless of the complexity of the molecule to be manufactured, chemists always try to find a way to reduce the reaction time and the number of steps required for synthesizing a molecule because of a constant concern regarding costs and profitability.

Many studies have been conducted for the purpose of controlling the various parameters capable of influencing the unfolding and speed of a reaction. Additives, such as solvents, catalysts, have been widely used. Although these compounds stimulate the reaction medium, they are sometimes toxic to man and the environment, and they require expensive post-treatments such as neutralization, washing, drying, filtration.

Today, the trend is toward manufacturing processes that are simple, low in cost, and respectful of man and his environment.

Some physical processes have been tested: the use of ultrasounds, high frequencies, and recently, microwaves.

The various tests conducted using dielectric heating, that is to say, heating under microwave frequencies or high frequencies, have shown the potential value of this new technology: indeed, dielectric heating permits considerable time and energy savings, combined with lower investment costs; the reactions no longer require the use of any solvent or catalyst; burn-up and unwanted reactions are avoided.

Although today there are available many types of high-frequency and microwave applicators, they are all nonetheless configured in such a way that the reaction medium is continuously exposed to electromagnetic waves in order to be able to benefit from the advantages inherent in this new technology. The amount of material processed in this manner is limited, because it depends on the dimensions of the waveguides that are themselves standardized.

SUMMARY OF THE INVENTION

The applicant has discovered a new heat treatment process involved in a chemical synthesis: namely, intermittent dielectric heating combined with a recycling system. The reagents are subjected to electromagnetic waves on an intermittent basis using a recycling system. The electromagnetic waves are selected among the frequencies ranging from 300 GHz to 3 MHz.

This process is original and low in cost. Additionally, this process enables operation on different scales, whether in laboratories, on a semi-industrial or industrial scale, without forfeiting the advantages of continuous dielectric heating.

APPLICATIONS

The invention makes it possible to carry out efficient and rapid heat treatments on different scales, whether in laboratories, on a semi-industrial or on industrial scale.

This invention relates to all "heat applications," that is to say, the chemical syntheses involving a heat treatment and featuring a sole reagent, or a mixture of reagents, in variable proportions, with or without catalysts, with or without process gas.

As "heat applications," we can cite, as non-limitative examples, such reactions as esterification, transesterification, epoxydation, sulphatation, phosphitation, hydrogenation, peroxydation, isomerization, dehydration, quaternization, amidation, polymerization, polycondensation, and all the common treatments such as decolorizing, deodorizing, and the other systems for eliminating volatile compounds.

The invention in fact applies very specifically to all "lipochemistry" reactions.

This innovative technique permits, for example, manufacturing polymers of unsaturated fatty acids, esters of unsaturated fatty acids, unsaturated hydrocarbons or derivatives of these products using intermittent dielectric heating under microwaves. In this connection, the applicant has filed a Patent Application FR 98 13770 and a Patent Application PCT WO 00/26265 (PCT/FR 99/02646).

PRIOR ART

The field of this invention relates to the use of microwave (MW) or high frequency (HF) electromagnetic waves for any heat treatment.

The MW and HF Frequencies

The MW microwave frequencies are comprised between about 300 MHz and about 30 GHz, preferably at 915 MHz (authorized frequency with a tolerance of 1.4%) or at 2.45 GHz (authorized frequency with a tolerance of 2%).

The HF high frequencies are comprised between about 3 MHz and about 300 MHz, preferably at 13.56 MHz (authorized frequency with a tolerance of 0.05%) or at 27.12 MHz (authorized frequency with a tolerance of 0.6%).

Absorbed Power

The Absorbed Power (AP) is a dependent variable of the Incident Power (IP) and of system losses.

For a product that hardly absorbs electromagnetic waves, and for a given Incident Power (IP), the Absorbed Power (AP) decreases and the losses increase, in particular those losses due to static electricity.

Indeed:

$$IP = AP + \text{losses}$$

Wherein:
IP=Incident Power in Watts
AP=Absorbed Power in Watts
Losses=heat losses+static electricity The Absorbed Power (in Watts) by a material under HF or MW treatment is expressed by the following formula:

$$AP = kf \in'' E^2 V$$

with:
AP: Absorbed Power in Watts
E: electric field created inside the material in V/cm
f: frequency of wave
K: constant (M.K.S.A)=$5.56.10^{-13}$
V: volume of material in $cm^3$
$\in''$: material loss factor=$\in'$tang δ
$\in'$: actual relative permittivity of the material=$\in_0 * \in_r$
$\in_0$: permittivity of vacuum
$\in_R$: dielectric constant
tang δ: angle of losses
$\in'$ translates the ability of a material to orient itself in the field, and tang δ its ability to release heat.

Note: For air or vacuum, ∈'=1 (lowest value for ∈') and tangδ=0, i.e., ∈"=0.

Type of Energy Applicators

The type of energy applicator selected depends on the technology used (high frequencies or microwaves), the dimensional characteristics of the product to be treated and its mode of treatment.

As regards high frequency applicators, these essentially consist in:

applicators of the capacitive type formed by two condenser armatures between which the generator's high-frequency voltage is applied. They are used for the heat treatment of materials whose volume constitutes a parallelepiped, one side of which is sufficiently thick (>10 mm).

applicators with rods for planar materials. These applicators are made up of tubular or rod-shaped electrodes. They are used for the heat treatment of materials whose volume constitutes a parallelepiped, one side of which is insufficiently thick (<10 mm).

applicators for filiform materials, formed by loops.

For the microwave applicators, we can cite:

localized-field applicators: singlemode cavity diffuse-field applicators: multimode cavity near-field applicators: guide with radiating antennas Among these microwave applicators, there are available on the market for example:

the "synthewave 402" and the "synthewave 1000" that are made up of 1 ml to 100 ml or 600 ml reactors the "Discover" with 1 ml to 125 ml reactors the "Ethos MR" with a capacity of less than 400 ml risks of electrical breakdown or electric arcs The Applicant has filed a Patent Application FR No 0108906 (US 2005029253, application Ser. No. 10/482,778) concerning an improved apparatus for carrying out dielectric heating. In said patent, the invention relates to a new shape or geometry of a chimney, in particular a chimney with a conical shape or geometry, which permits heating any type of product under microwave frequencies or high frequencies, in statics or dynamics with a sizeable power density without any risk of electric arcs or electrical breakdown.

Any person skilled in the art may refer to said patent application for further details. For his/her convenience, a summary thereof is provided hereinbelow.

In the case of hardly absorbent molecules, the choice of applicators is complicated. The applicator in fact has to transmit a great deal of electromagnetic energy to the product in order to be able to provide heat while avoiding electric arcs.

Heating under microwave frequencies is preferable to heating under high frequencies for which the risk of electrical breakdown is greater.

The "singlemode" system (localized field) which is formed by singlemode cavities resonating at the transmission frequency according to a radiation in the direction of the guide is preferred to the "multimode" (diffuse field). The singlemode system avoids a non-homogeneous distribution of the electric field and the presence of hot points. Likewise, this type of reactor creates stability in the products exposed.

The singlemode applicator outfitted with the usual cylindrical chimneys, which is the most suitable one of all common applicators with hardly absorbent molecules, does not permit working with a high density of power without running the risk of electrical breakdown.

Nonetheless, the introducing into the reaction medium of some polar compounds such as water, so as to play the role of intermediary in energy transfer and thus reduce the density of power needed, is still not satisfactory. Unwanted side reactions can take place, making supplemental treatments such as neutralization, washing, drying or filtration necessary to purify the product at the end of the reaction.

One alternative to mitigate the problems related to the hardly absorbent compounds is to eliminate the static electricity as it forms on the outer wall of the reactor. In order to eliminate the static electricity, one must either make for a good ventilation using humid air or some other gas that is comparable from the standpoint of its dielectric constants (for example: sulfur hexafluoride $SF_6$ under 1 bar) (1st solution), or adapt the shapes of the chimneys so as to aerate them (2nd solution). The first solution is not attractive due to the complexity of equipment, safety issues, and cost reasons.

The applicant has discovered a new chimney shape or geometry, in particular a conical chimney, that makes it possible to heat any type of products under microwave frequencies or high frequencies, in statics or in dynamics, with a sizeable power density without any risk of electric arcs or electrical breakdown.

DESCRIPTION OF THE INVENTION

Figure 1:
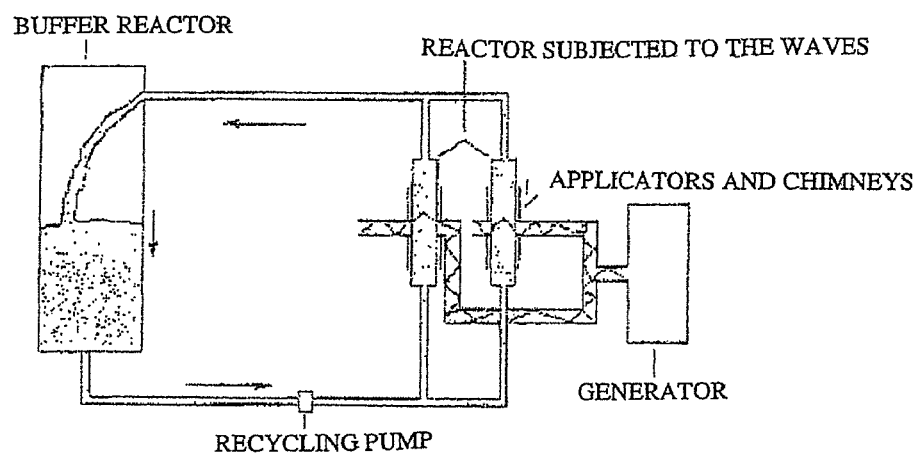
FIG. 1 illustrates a configuration subjecting several reactors to electromagnetic waves.

The applicant has discovered a new heat treatment process that consists of submitting the reagent, either alone or in a mixture, to electromagnetic waves in an intermittent manner, with the help of a recycling system.

The electromagnetic waves are selected in the frequencies ranging between 300 GHz and 3 MHz.

This process retains the advantages of continuous dielectric heating while increasing production capacity.

Description of the Equipment

The intermittent heating process is simple and low-cost. It consists of pumps reactors subjected to the electromagnetic field a dielectric system: chimney applicators, generator waveguides, iris, shortcircuit piston, cooling systems buffer reactors tanks a gas circuit, preferably for an inert gas such as nitrogen condensers measuring devices The Pumps The pump(s) is (are) of the variable-flow type.

It can be a feeder dosing pump and/or a recycling pump and/or a vacuum pump. The outflow of the recycling pump influences the time required for a molecule to transit under the waves.

The pumps can be selected, for purposes of indication, from among vane pumps or piston pumps.

Reactors Subjected to the Electromagnetic Field

The reactors subjected to the electromagnetic field do not absorb the waves (pyrex, quartz, etc.).

They are typically cylindrical in shape.

They are positioned inside applicators.

Dielectric System: Chimney Applicators, Generator Waveguides, Iris, Shortcircuit Piston, Cooling Systems The applicators are formed by singlemode cavities that resonate at the transmission frequency according to a radiation in the direction of the waveguide. The chimneys prevent wave leakage to the outside of the waveguide. They are preferably of a conical cylindrical shape, as indicated in Application FR No 0108906 (US 2005029253, application Ser. No. 10/482,778) filed by this Applicant for limiting the presence of electric arcs.

The waveguide(s) carries/carry the electromagnetic waves. Each waveguide can be subdivided into two—and only two—waveguides.

The generators used are microwave or high-frequency generators.

The microwave (MW) frequencies range from about 300 MHz to about 30 GHz, preferably standing at 915 MHz (authorized frequency with a tolerance of 1.4%) or at 2.45 GHz (authorized frequency with a tolerance of 2%).

The high frequencies (HF) range from about 3 MHz to about 300 MHz, preferably standing at 13.56 MHz (authorized frequency with a tolerance of 0.05%) or at 27.12 MHz (authorized frequency with a tolerance of 0.6%).

The generators are outfitted with a safety feature that allows the incident waves to pass through and that diverts the reflected waves to a water load in which the waves are absorbed.

These generators also require the use of iris, of a shortcircuit piston in order to decrease the reflected power and to promote absorption of the generator-transmitted power by the reaction mixture.

The system is outfitted with cooling systems in order to avoid any overheating.

The Buffer Reactors

The buffer reactors permit treating a larger amount of reaction mixture.

The Tanks

The system is outfitted with one or several feeder tank(s), receiver tank(s), filtration tank(s).

The Gas Circuits

The heat treatments are carried out under a normal atmosphere, or an oxygen-rich atmosphere or, preferably, an inert atmosphere.

The Measuring Devices

The system is outfitted with measuring devices such as manometers, thermocouples, flowmeters.

This process can be used in dynamics or in continuum

Principle of Intermittent Heating

The entire reaction volume is not continuously exposed to the waves; however, all molecules of the reaction mixture are intermittently subjected to the field. Various configurations may be considered for carrying out an intermittent dielectric heating.

The first configuration consists in subjecting several reactors to the electromagnetic waves. See FIG. 1.

Figure 2:
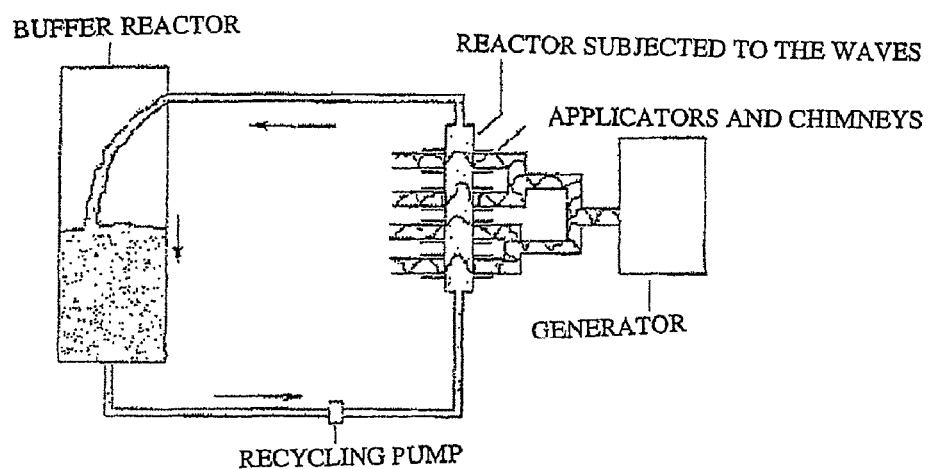
FIG. 2 illustrates a configuration using several energy applicators on a single reactor.

The second configuration consists in using several energy applicators on a single reactor. See FIG. 2.

The number of applicators depends on the desired working temperature, on the amount of product to be treated, on the reaction temperature rise time, on the dielectric constants of the reagents.

Any person skilled in the art will understand that other configurations are possible besides these two and that the invention relates to all other intermediate positions.

Furthermore, the applicant has discovered an original system consisting in circulating the reaction mixture in a loop, thus reducing investment costs for an equivalent production capacity. Without this recycling system, it would indeed be necessary to use a large-size reactor and a multitude of applicators in order to succeed in heating the same amount of products and to achieve the desired result, which would entail enormous costs.

Figure 3:
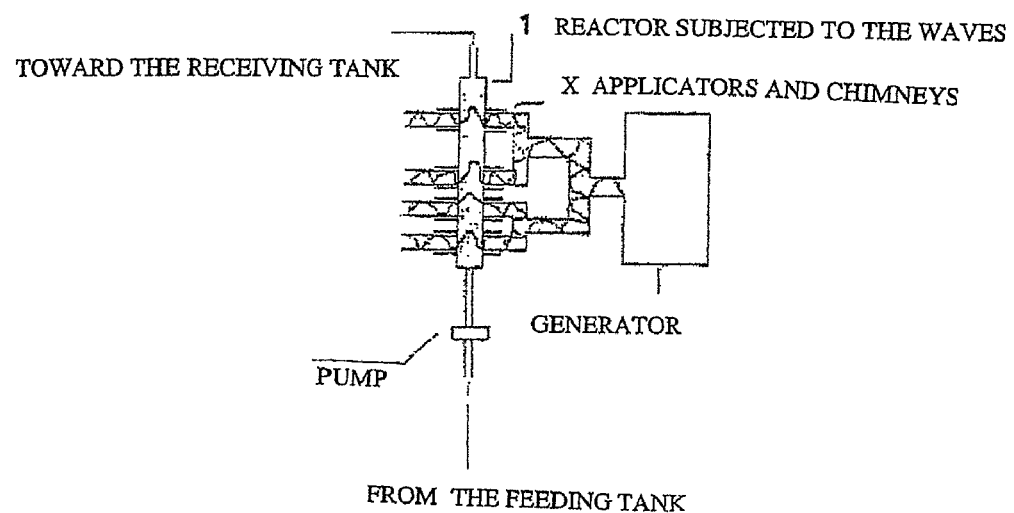
FIG. 3 illustrates a reactor of the dielectric heating system.

See FIG. 3.

Figure 4:
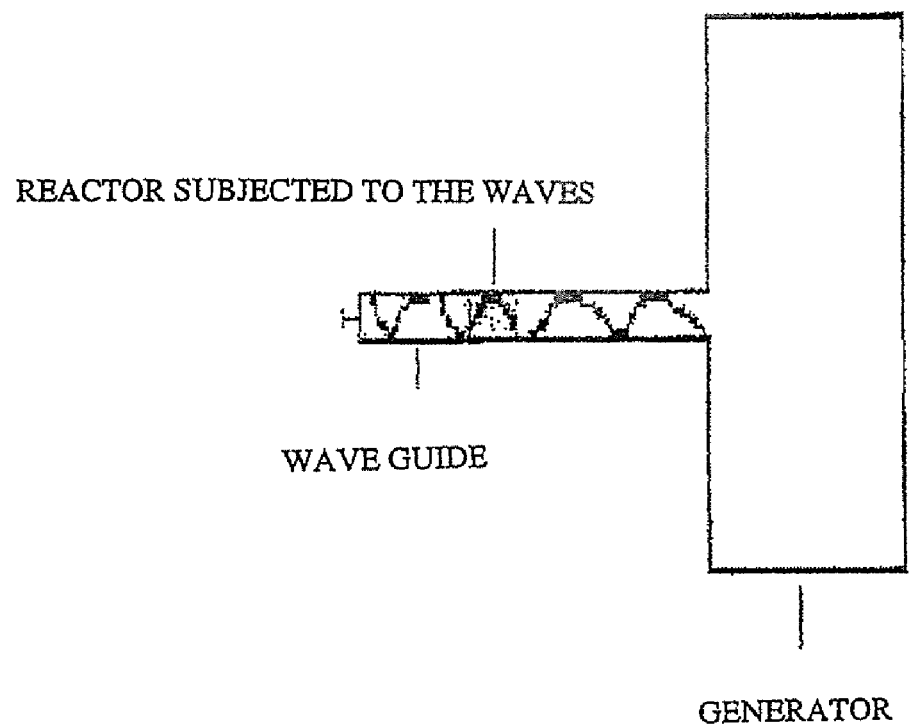
FIG. 4 illustrates a reactor subjected to electromagnetic waves.

The intermittent dielectric heating combined with a recycling system makes it possible to increase the production capacities, which are limited under the continuous dielectric heating system, represented in FIG. 4 or FIG. 3 if the applicators cover the entire volume to be treated.

This process can be used in dynamics or in continuum.

According to this configuration, the entire reaction volume is not continuously exposed to the waves; however, all molecules of the reaction mixture are intermittently subjected to the field.

It should be noted that, according to this principle, the invention logically should not have functioned, that is to say, it should logically not have yielded any good results. As a matter of fact, a molecule will only be subjected to the electromagnetic waves for a fraction of its circulation time, for example, 1 sec every 10 sec. Any person skilled in the art understands that this should have produced either very poor results (inefficient process) or zero results. Yet, surprisingly we obtain on the contrary very good results (see hereinbelow) accompanied by the major advantages also mentioned herein.

Volume Exposed to the Electromagnetic Field

The volume exposed to the electromagnetic field is calculated according to the formula below:

$$V(\text{exposed to the field}) = \pi * R^2 * H$$

wherein:

R=radius of reactor exposed to the field

H=height of reactor exposed to the field

Parameter H:

The height of the reactor exposed to the field typically corresponds to that of the waveguide in order to permit treating the maximum amount of material all at once.

Let's take the case of heat treatments under singlemode microwave, at 2450 MHz. The height of the waveguide in Mode TE 0.1 (Transverse Electric) is equal to 45 mm. The fundamental mode of excitation TE 0.1 makes it possible for the wave to propagate as a single arch, contrary to Mode TE 0.2 which presents two field maxima, yielding a less homogenous heating.

Let's take the case of heat treatments under singlemode microwave, at 915 Hz. In that case, the height of the waveguide is equal to 124 mm.

Parameter R

Typically, the reactor is cylindrical in shape. Its diameter may not exceed the width of the waveguide.

In the case of singlemode microwave applicators, under 2450 MHz, the recommended waveguide width in order to remain in Mode TE 0.1 (Transverse Electric) ranges from about 70 to 100 mm, standing more specifically at 90 mm.

In the case of the singlemode microwave applicators, under 915 MHz, the recommended waveguide width in order to remain in Mode TE 0.1 (Transverse Electric) stands at about 250 mm.

Advantages of the Intermittent Dielectric Heating

Contrary to the common dielectric systems this invention surprisingly permits heating volumes of materials on an industrial scale while keeping the process low-cost. Therefore, the Applicant has devised a process involving intermittent dielectric heating combined with a recycling system.

The Applicant demonstrates by this invention that the reagents benefit from the advantages inherent to the electromagnetic wave technology without being continuously exposed to the field. Indeed, the benefits of the dielectric heating are preserved:

1. the reaction time is significantly reduced;
2. the reaction is carried out in a single step
3. non-use of solvent
4. energy savings (because the times are significantly shorter)
5. absence of burn-up and side reactions.

Reagents:

For this invention, the reagent(s) can be selected from among the products that are hardly absorbent of electromagnetic waves or the products that are highly absorbent of said electromagnetic waves, or a mixture of both, which may or may not be enhanced by one or several hardly or highly absorbent catalysts or additives and/or process gases.

vegetable oils

As vegetable oils, we may mention, among others, rapeseed oil, sunflower oil, peanut oil, olive oil, walnut oil, corn oil, soy oil, linseed oil, safflower oil, apricot kernel oil, sweet almond oil, hemp oil, grapeseed oil, copra oil, palm oil, cottonseed oil, Babassu oil, jojoba oil, sesame oil, argan oil, milk-thistle oil, gourdseed oil, raspberry oil, Karanja oil, neem oil, poppyseed oil, Brazil nut oil, castor oil, dehydrated castor oil, hazelnut oil, wheat germ oil, borage oil, oenothera oil, Tung oil, or tall oil.

animal fats or oils

As animal oils or fats, we can cite, among others, spermwhale oil, dolphin oil, whale oil, seal oil, sardine oil, herring oil, shark (dog-fish) oil, cod liver oil, neatsfoot oil, as well as beef, pork, horse, mutton tallow (marrow).

animal or vegetable oil compounds

We can also use compounds of animal or vegetable oils such as squalene extracted from non-saponifiable fats of vegetable oils (olive oil, peanut oil, rapeseed oil, corn germ oil, cottonseed oil, linseed oil, wheat germ oil, rice bran oil) or squalene contained in massive amounts in shark (dog-fish) oil.

These animal or vegetable fats and oils, as well as their derivatives, can undergo a prior treatment intended to make them on the one hand more reactive or on the other hand less reactive. The invention relates to both an isolated reagent and a reaction mixture comprising two or more components. These reaction mixtures can include equivalent proportions of each compound; or, certain compounds can be the primary compounds.

hydrocarbons

As unsaturated hydrocarbons, we can cite, alone or in a mixture, and as non-limitative examples, an alcene, for example one or several terpenic hydrocarbons, that is to say, one or several polymers of isoprene, or one or several polymers of isobutene, of styrene, of ethylene, of butadiene, of isoprene, of propene, or one or several copolymers of these alcenes.

As saturated hydrocarbons, we can cite, among others, the alcanes, for example ethane, propane.

saturated and/or unsaturated esters

As for esters of saturated and/or unsaturated fatty acids, we can use such acids either alone or as a mixture, and by way of non-limitative examples, one or several esters obtained by esterification between a monoalcohol and/or polyol and at least one saturated and/or unsaturated fatty acid; waxes; butters, phospholipids; spingolipids; glucolipids.

saturated and/or unsaturated acids

As unsaturated fatty acids, we can use, either alone or in a mixture, and as non-limitative examples, one or several saturated acids such as caprylic acid, lauric acid, myristic acid, palmitic acid, stearic acid, arachidic acid, behenic acid, lignoceric acid, cerotic acid, one or several monounsaturated fatty acids such as oleic acid, palmitoleic acid, myristic acid, petroselenic acid, erucic acid; one or several polyunsaturated fatty acids such as for example linoleic acid, alpha and gamma linolenic acids, arachidonic acid; 5c,8c,11c,14c-eicosapentaenoic acid (EPA), 4c,7c,10c,13c,16c,19c-docosahexaenoic acid (DHA), one or several acids comprising conjugated dienes or conjugated trienes such as licanic acid, isomers of linoleic and linolenic acids; one or several acids comprising one or several hydroxyl groups such as ricinoleic acid.

alcohols

As alcohols, we can mention, among others, glycerol, sorbitol, sucrose, mannitol, xylitol, neopentylglycol, pentaerythritol, saccharose, galactose, glucose, maltose, maltotriose, fructose, maltitol, lactitol, lactose, ribose, mellibiose, cellobiose, gentiobiose, altrose, gulose, polyalkyleneglycols, polyglycerols, polyphenols, alkylpolyglucosides, polyglucosides, glycol, pentaerythritol, 1,2-ethanediol, 1,4-butanediol; 1,6-hexanediol, aminoalcohols (for example, diethanol amine (DEA), triethanol amine (TEA), 3-amino-1,2-propanediol), epoxyalcohols, saturated or unsaturated fatty alcohols (for example, myristyl alcohol, oleyl alcohol, lauryl alcohol), linear or branched alcohols, vitamins (for example, tocopherol, ascorbic acid, retinol), sterols (including phytosterols), hemiacetals (for example, 1-ethoxy-1-ethanol), aminoalcohols (for example, 2-2'-aminoethoxy ethanol), epoxyalcohols (for example, 2-3-epoxy-1-propanol), propanol, ethanol, methanol, tetradecyl alcohol and their analogs.

The alcohols as well as their derivatives can undergo a prior treatment intended to make them more reactive or, on the contrary, less reactive, such as for example: hydrogenation, hydroxylation, epoxydation, phosphitation, sulfonation.

epoxides

As epoxydes, we can use, alone or in a mixture, and as non-limitative examples, vernolic acid, coronaric acid; 1,2-epoxy-9-decene, 3-4-epoxy-1-butene, 2-3-epoxy-1-propanol, fatty esters obtained by esterification between 2-3-epoxy-1-propanol and a fatty acid (for example, Cardura E10®).

amino alcohols

As amino alcohols, we can use, alone or in a mixture, and as non-limitative examples, monoethanol amine (MEA), diethanol amine (DEA), triethanol amine (TEA), 3-amino-1, 2-propanediol, 1-amino-2-propanol; 2-2'-aminoethoxy ethanol.

amines

As amines, we can mention, among others, ammonia, primary, secondary and tertiary alkyl amines (for example, methyl amine, dimethyl amine, trimethyl amine, diethyl amine), fatty amines (for example, oleic amines, coconut alkyl amines), amino alcohols (for example, monoethanol amine (MEA), diethanol amine (DEA), triethanol amine (TEA), 3-amino-1,2-propanediol, 1-amino-2-propanol), ethoxylated amines (2-2'-aminoethoxy ethanol, amino-1-methoxy-3-propane).

All these amines can be saturated or nonsaturated, linear or branched.

catalysts

Among the catalysts or additives, there shall be, as non-limitative examples, the common acid catalysts (para toluene sulfonic acid, sulfuric acid, phosphoric acid, perchloric acid, etc.), the common basic catalysts (soda, potash, alcoholate of alkaline metals and of alkaline-earth metals, sodium acetate, triethyl amines, pyridine derivatives, etc.), acid and/or basic resins of the Amberlite™, Amberlyst™, Purolite™, Dowex™, Lewatit™ types, zeolithes and enzymes, carbon blacks, and activated carbon fibers.

The invention will be better understood upon reading the following description and the non-limitative examples given below.

EXAMPLES

The examples given below highlight the value of the invention and will allow any person skilled in the art to easily extrapolate to other dimensions and/or geometries without departing from the true scope and spirits of the invention in its broader aspects.

Additionally, the following examples, which are given solely for purposes of description and in no way of limitation, illustrate the value of the invention. These examples aim to demonstrate that the intermittent dielectric heating process is low-in-cost and permits heating reaction volumes on an industrial scale while still benefiting from the advantages of this technology.

I. Volumes Exposed to Electromagnetic Waves

The tests were conducted on the laboratory and on industrial scale using two (2) generators:

one (1) 6 kW magnetron generator operating at the 2450 MHz frequency for the laboratory treatments one (1) 60 kW magnetron generator operating at the 915 MHz frequency for the industrial treatments

|  | D (mm) | H (mm) | Unit Vexp | Number of reactors | Total Vexp |
|---|---|---|---|---|---|
| Pilot | 30 | 45 | 32 mL | 1 | 32 mL |
| Industrial | 100 | 124 | 1 L | 4 | 4 L | wherein:
D = diameter of cylindrical reactors = 2R
H = height of waveguide
Unit Vexp = volume exposed continually basis to waves for one reactor
Total Vexp = volume exposed continually to waves for both reactors $$V(\text{exposed to the field}) = \pi/R^2 * H$$

II. Comparison between Conventional Heating and Intermittent Dielectric Heating a. Polyglycerol Synthesis The tests are conducted at 260° C., in the presence of 2% sodium acetate in order to obtain a polyglycerol with a viscosity at 50° C. equal to 3600 cP.

They make reference to Patent Application FR No 0108906 (US 2005029253, application Ser. No. 10/482,778).

|  |  | Total V of glycerol | V ratio | Reaction Time |
|---|---|---|---|---|
| Intermittent dielectric heating | Pilot industrial | 2000 mL 200 L | 1/62 1/50 | 3 h 6 h 30 min |
| Conventional heating | Schou |  |  | >72 h | wherein:
Total V of glycerol = total volume of glycerol treated
V ratio = ratio between the volume exposed to waves and the total volume treated b. Synthesis of Polyglycerol Esters
Synthesis of Polyglycerol-6 Dioleate The tests are carried out in the presence of 0.25% sodium acetate at 230° C.

They make reference to Patent Application FR No 0108906 (US 2005029253, application Ser. No. 10/482,778).

|  | Total V of mixture | V ratio | Reaction time |
|---|---|---|---|
| Intermittent dielectric heating | 2000 mL | 1/62 | 2 h 10 min |
| Conventional heating |  |  | 4 h 30 min | wherein:
Total V of mixture = total volume treated
V ratio = ratio between the volume exposed to waves and the total volume treated Synthesis of Polyglycerol-2 Tristearate The tests are carried out in the presence of 0.25% sodium acetate at 260° C.

They make reference to Patent Application FR No 0108906 (US 2005029253, application Ser. No. 10/482,778).

|  | Total V of mixture | V ratio | Reaction time |
|---|---|---|---|
| Intermittent dielectric heating | 2000 mL | 1/62 | 1 h 40 min |
| Conventional heating |  |  | 4 to 5 h | wherein:
Total V of mixture = total volume treated
V Ratio = ratio between the volume exposed to waves and the total volume treated c. Conclusion Even if the entire reaction volume is not exposed to electromagnetic waves, the reaction times under intermittent dielectric heating are considerably lower than those obtained with conventional heating.

III. Comparison Between Intermittent Dielectric Heating and Continuous Dielectric Heating a. Efficiency of Intermittent Dielectric Heating The table below shows the efficiency of intermittent dielectric heating compared with continuous dielectric heating which is typically used.

The tests are carried out under the same conditions (composition of reaction mixtures, temperatures, catalysts, etc.)
at the laboratory scale (use of a Synthewave 402) which uses continuous dielectric heating at the pilot scale, using a 2450 MHz generator that uses intermittent dielectric heating and at the production scale using a 915 MHz generator that uses intermittent dielectric heating The synthesis tested consists in manufacturing unsaturated fatty acid polymers, unsaturated fatty acid esters, unsaturated hydrocarbons, unsaturated derivatives of these compounds, alone or in a mixture.

|  | Laboratory Mop | Pilot MOi | Pilot Extrapolated Mop | Industrial MOi | Industrial Extrapolated Mop |
|---|---|---|---|---|---|
| $V_{treated}$ (mL) | 25 | 2000 | 2000 | 200000 | 200000 |
| V ratio | 1/1 | 1/62 | 1/1 | 1/50 | 1/1 |
| $t_{reaction}$ (h) | 2 h 15 min | 2 h 15 min | ≧2 h 15 | 2 h 15 | ≧2 h 15 | wherein:
Mop = continuous microwave heating
Extrapolated Mop = continuous microwave heating in the case of treatment of 200 kg of product
Moi = intermittent microwave heating
$V_{treated}$ = reaction volume treated
V ratio = ratio between the volume exposed to electromagnetic waves and the total reaction volume
$t_{reaction}$ = reaction time
**Treating a large amount of products requires a reaction time greater than or equal to that for a lower amount. The reaction time is 2 h 15 for 25 mL of product. Thus, it can be asserted that the reaction time needed to treat 200 kg of the same mixture will be greater than or equal to 2 h 15.

This table shows that the reaction times are unchanged, whether one works on 25 mL, 2 kg, or 200 kg. However, in the case of pilot and industrial tests (2 kg and 200 kg), the entire volume is not subjected to dielectric heating:

laboratory test (continuous dielectric heating): the entire volume is exposed to electromagnetic waves with Ratio=1/1 pilot test (intermittent dielectric heating): only 1/62 of the volume is exposed to the field industrial test (intermittent dielectric heating): only 1/50 of the volume is exposed to the field b. Lowering of Investment Costs If we had to treat 200 liters of product using continuous dielectric heating, we would have to expose all 200 liters to the electromagnetic waves.

By working at the 2450 MHz frequency, the maximum volume exposed by applicator is 32 mL. Here this configuration is not advantageous at all. In fact, we would need 6250 applicators.

By working at the 915 MHz frequency, the maximum volume exposed by applicator is 1 L. We would then need 200 applicators.

For this invention, intermittent dielectric heating makes it possible to use only four (4) applicators, that is to say, 50 times less (a ratio consistent with that given in the preceding table) for the same production capacity.

We can compare the investment costs:
X=investment cost of a system with intermittent dielectric heating, 4 channels, recycling
Y=investment cost of a system with continuous dielectric heating, 200 channels, without recycling
Y=10*X The investment cost would then be 10 times higher in the case of a continuous dielectric heating compared with intermittent dielectric heating. This is essentially due to the cost of applicators, which is much higher than the rest of the system (buffer reactor, recycling pump, etc.).

The invention claimed is:

1. A process of heat treatment in a chemical synthesis comprising circulating one or more reagents in a recycling system; and subjecting said reagent(s) to electromagnetic waves intermittently, wherein the reagent(s) is/are subjected to said electromagnetic waves in one part of the recycling system and not in another part of the recycling system;

wherein said heat treatment is intermittent dielectric heating, and wherein the reagents are exposed to electromagnetic waves generated with:

one (1) 6 kW magnetron generator operating at a frequency of about 2450 MHz for laboratory treatments with a Total Vexp of 32 ml, or one (1) 60 kW magnetron generator operating at a frequency of about 915 MHz for industrial treatments with a Total Vexp of 4 L.

2. The process according to claim 1, wherein the electromagnetic waves are selected from frequencies ranging between 3 MHz and 2450 MHz.

3. The process according to claim 1, wherein the reagents are not continuously exposed to dielectric heating but wherein all reaction mixture molecules are intermittently subjected to dielectric heating.

4. The process according to claim 1, wherein the reagent(s) are selected from among products that hardly absorb electromagnetic waves or products that are highly absorbent of said electromagnetic waves or a mixture of both, wherein said process is either not enhanced or enhanced with one or several hardly or highly absorbent catalysts or additives and/or process gas.

5. The process according to claim 4, wherein the reagent(s) is/are selected from the group consisting of vegetable oils, animal fats or oils, compounds of animal or vegetable oils, hydrocarbons, saturated alkanes, saturated and/or unsaturated esters, saturated and/or unsaturated acids; alcohols; epoxides; amino alcohols; and amines.

6. The process according to claim 5, wherein
said vegetable oils are selected from the group consisting of rapeseed oil, sunflower oil, peanut oil, olive oil, walnut oil, corn oil, soy oil, linseed oil, safflower oil, apricot kernel oil, sweet almond oil, hemp oil, grassed oil, copra oil, palm oil, cottonseed oil, Babes oil, jujube oil, sesame oil, argon oil, milk-thistle oil, gourds oil, raspberry oil, Carnage oil, enema oil, poppies oil, Brazil nut oil, castor oil, dehydrated castor oil, hazelnut oil, wheat germ oil, borage oil, oenothera oil, Tung oil, and tall oil;

said animal fats or oils are selected from the group consisting of sperm-whale oil, dolphin oil, whale oil, seal oil, sardine oil, herring oil, shark (dog-fish) oil, cod-liver oil, neatsfoot oil, as well as beef, pork, horse, and mutton tallow (marrow);

said compounds of animal or vegetable oils are selected from the group consisting of squalene extracted from non-saponifiable fats of vegetable oils: olive oil, peanut oil, rapeseed oil, corn germ oil, cottonseed oil, linseed oil, wheat germ oil, rice bran oil, and squalene contained in large amounts in shark (dog-fish) oil;

said hydrocarbons are unsaturated, alone or in a mixture, alkene, or a saturated or unsaturated alkane;

said saturated and/or unsaturated esters are selected from the group consisting of alone or in a mixture, one or several esters obtained by esterification between a monoalcohol and/or polyol and at least one saturated and/or unsaturated fatty acid; waxes; butters, phospholipids; spingolipids; and glucolipids;

said saturated and/or unsaturated acids are selected from the group consisting of alone or in a mixture, one or several saturated acids, one or several monounsaturated fatty acids; one or several polyunsaturated fatty acids, one or several acids comprising conjugated dienes or conjugated trienes, and one or several acids comprising one or several hydroxyl groups;

said alcohols are selected from the group consisting of glycerol, sorbitol, sucrose, mannitol, xylitol, neopentylglycol, pentaerythritol, saccharose, galactose, glucose, maltose, maltotriose, fructose, maltitol, lactitol, lactose, ribose, mellibiose, cellobiose, gentiobiose, altrose, gulose, polyalkyleneglycols, polyglycerols, polyphenols, alkylpolyglucosides, polyglucosides, glycol, pentaerythritol, 1,2-ethanediol, 1,4-butanediol; 1,6-hexanediol, aminoalcohols, epoxyalcohols, saturated or unsaturated fatty alcohols, linear or branched alcohols, vitamins (for example, tocopherol, ascorbic acid, retinol), sterols (including phytosterols), hemiacetals, aminoalcohols, epoxyalcohols, propanol, ethanol, methanol, tetradecyl alcohol and their analogs;

said epoxides are selected from the group consisting of alone or in a mixture, vernolic acid, coronaric acid, 1,2-epoxy-9-decene, 3-4-epoxy-1-butene, 2-3-epoxy-1-propanol, and fatty esters obtained by esterification between 2-3-epoxy-1-propanol and a fatty acid;

said amino alcohols are selected from the group consisting of alone or in a mixture, monoethanol amine (MEA), diethanol amine (DEA), triethanol amine (TEA), 3-amino-1,2-propanediol, 1-amino-2-propanol; and 2-2'-aminoethoxy ethanol; and said amines are selected from the group consisting of ammonia, primary, secondary and tertiary alkyl amines, fatty amines, amino alcohols, triethanol amine (TEA), 3-amino-1,2-propanediol, 1-amino-2-propanol), and ethoxylated amines, wherein said amines can be saturated or unsaturated, linear or branched.

7. The process according to claim 6, wherein the animal or vegetable fats and oils undergo a prior treatment to make them more reactive or less reactive.

8. The process according to claim 6, wherein the alcohols undergo a prior treatment intended to make them more reactive or less reactive.

9. The process according to claim 1, wherein said process uses catalysts or additives selected from the group consisting of common acid catalysts, common basic catalysts, acid and/or basic resins, zeolithes, enzymes, carbon black, and activated carbon fibers.

10. The process according to claim 1, wherein the heat treatments are carried out under a normal atmosphere, an oxygen-rich atmosphere, or an inert atmosphere.

11. The process according to claim 1 wherein said chemical synthesis includes a heat treatment and the use of a single reagent, or a mixture of reagents, in variable proportions, with or without catalysts, with or without process gas.

12. The process according to claim 11, wherein said chemical synthesis is selected from the group consisting of esterification, transesterification, epoxidation, sulfation, phosphatation, hydrogenation, peroxidation, isomerization, dehydration, quaternization, amidation, polymerization, polycondensation, decolorizing, deodorizing, and systems for eliminating volatile compounds.

13. The process according to claim 1, wherein said chemical synthesis is a lipochemistry reaction.

14. The method according to claim 1, wherein said chemical synthesis is selected from the group consisting of manufacturing polymers of unsaturated fatty acids, manufacturing polymers of unsaturated fatty acid esters, manufacturing polymers of unsaturated hydrocarbons and manufacturing derivatives of these products using intermittent dielectric heating under microwaves.

15. The method according to claim 1, wherein said chemical synthesis results in the synthesis of polyglycerol, polyglycerol esters, polyglycerol-6 dioleate, and/or polyglycerol-2 tristearate.

16. The method according to claim 1, wherein said microwave frequency is a standing frequency at 915 MHz (authorized frequency with a tolerance of 1.4%) or at 2.45 GHz (authorized frequency with a tolerance of 2%).

17. The process according to claim 1 wherein said high frequency is a standing frequency at 13.56 MHz with a tolerance of 0.05% or at 27.12 MHz with a tolerance of 0.6%.

18. The process according to claim 8, wherein the prior treatment is selected from the group consisting of hydrogenation, hydroxylation, epoxidation, phosphatation, sulfonation reactions or combinations thereof.

19. The process according to claim 9 wherein said common acid catalyst is selected from the group consisting of para toluene sulfonic acid, sulfuric acid, phosphoric acid, perchloric acid and combinations thereof.

20. The process according to claim 9, wherein said common basic catalyst is selected from the group consisting of soda, potash, alcoholate of alkaline metals, alcoholate of alkaline-earth metals, sodium acetate, triethyl amines, pyridine derivatives and combinations thereof.

21. The process according to claim 10, wherein the heat treatments are carried out in an inert atmosphere.

22. A process of heat treatment in a chemical synthesis, comprising
circulating one or more reagents in a recycling system;
subjecting said reagent(s) to electromagnetic waves intermittently, wherein the reagent(s) is/are subjected to said electromagnetic waves continuously in one part of the recycling system and not in another part of the recycling system;
wherein said electromagnetic waves are generated with:
one (1) 6 kW magnetron generator operating at a frequency of about 2450 MHz for laboratory treatments with a Total Vexp of 32 ml, or
one (1) 60 kW magnetron generator operating at a frequency of about 915 MHz for industrial treatments with a Total Vexp of 4 L.

23. A process of heat treatment in a chemical synthesis comprising
circulating one or more reagents in a recycling system; and
subjecting said reagents to electromagnetic waves intermittently, wherein the reagents are subjected to said electromagnetic waves in one part of the recycling system and not in another part of the recycling system;
wherein said heat treatment is intermittent dielectric heating, wherein at least one of said reagents is a compound which hardly absorbs electromagnetic waves, and wherein the reagents are exposed to electromagnetic waves generated with:
one (1) 6 kW magnetron generator operating at a frequency of about 2450 MHz for laboratory treatments with a Total Vexp of 32 ml, or
one (1) 60 kW magnetron generator operating at a frequency of about 915 MHz for industrial treatments with a Total Vexp of 4 L.

24. The method according to claim 1, wherein said method is carried out on a production scale using a 915 MHz generator.

* * * * *